(12) United States Patent
Vyas et al.

(10) Patent No.: US 10,845,996 B2
(45) Date of Patent: Nov. 24, 2020

(54) MANAGING DATA THROUGHPUT FOR SHARED STORAGE VOLUMES USING VARIABLE VOLATILITY

(71) Applicant: Red Hat, Inc., Raleigh, NC (US)

(72) Inventors: Jay Vyas, Raleigh, NC (US); Huamin Chen, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 15/604,077

(22) Filed: May 24, 2017

(65) Prior Publication Data

US 2018/0341414 A1 Nov. 29, 2018

(51) Int. Cl.
G06F 3/06 (2006.01)

(52) U.S. Cl.
CPC .......... G06F 3/0619 (2013.01); G06F 3/0622 (2013.01); G06F 3/0659 (2013.01); G06F 3/0673 (2013.01)

(58) Field of Classification Search
CPC ...... G06F 3/0619; G06F 3/067; G06F 3/0622; G06F 3/0659
See application file for complete search history.

(56) References Cited

U.S. PATENT DOCUMENTS

| | | | |
|---|---|---|---|
| 7,395,279 B2 * | 7/2008 | Iyengar | G06F 17/30215 |
| 9,047,351 B2 | 6/2015 | Riddle et al. | |
| 9,292,566 B2 * | 3/2016 | Golab | G06F 16/2365 |
| 2007/0203910 A1 * | 8/2007 | Ferguson | G06F 17/30575 |
| 2014/0025753 A1 * | 1/2014 | Gronowski | H04L 63/0421 |
| | | | 709/206 |
| 2016/0162693 A1 | 6/2016 | Breuer et al. | |
| 2016/0239011 A1 | 8/2016 | Lo et al. | |
| 2016/0359955 A1 | 12/2016 | Gill et al. | |

(Continued)

OTHER PUBLICATIONS

Author Unknown, "OpenShift Container Platform 3.4," Guidelines, docs.openshift.com/container-platform/3.4/creating_images/guidelines.html, accessed Mar. 27, 2017, Red Hat, Inc., 6 pages.

(Continued)

*Primary Examiner* — David Yi
*Assistant Examiner* — Alan Otto
(74) *Attorney, Agent, or Firm* — Withrow & Terranova, PLLC (57) ABSTRACT

Managing data throughput for a shared storage volumes using variable volatility is provided. In one example, a node comprising a processor-based device and managing a shared storage volume within a network receives a volatility request via a volatility gateway. The node updates a volatility setting based on the volatility request. The node receives a read request directed to the shared storage volume, and determines whether strict data consistency for the shared storage volume should be enforced for the read request based on the volatility request. If so, the node acquires a write lock on the shared storage volume. Otherwise, the node performs a dirty read operation on the shared storage volume in response to the read request. In some examples, the volatility request may be received from an administrative endpoint, or may be automatically transmitted by a volume controller agent in response to network traffic exceeding a network traffic threshold.

15 Claims, 6 Drawing Sheets

(56) References Cited

U.S. PATENT DOCUMENTS

2016/0359975 A1  12/2016  Battle et al.
2016/0378545 A1  12/2016  Ho

OTHER PUBLICATIONS

Author Unknown, "Volumes," Kubernetes, Concepts, www.kubernetes.io/docs/concepts/storage/volumes/, accessed on Mar. 28, 2017, The Linux Foundation, 15 pages.

Author Unknown, "What is a Pod?," www.github.com/kuberbetes/kubernetes.github.io/blob/master/docs/user-guide/pods/index.md, accessed Mar. 27, 2017, GitHub, Inc., 4 pages.

Toderoiu, Cristina-Ana, "Security in Service Oriented Architectures—Volatility-Based Hedging Support System," Journal of Mobile, Embedded and Distributed Systems, vol. 7, Issue 3, 2015, pp. 136-141.

Trice, Andrew, "Exposing OpenWhisk RESTful APIs with API Gateway," Bluemix Blog, Jan. 4, 2017, IBM Corporation, 6 pages.

* cited by examiner

MANAGING DATA THROUGHPUT FOR SHARED STORAGE VOLUMES USING VARIABLE VOLATILITY

TECHNICAL FIELD

The examples relate generally to management of data throughput for shared storage volumes, and, in particular, to providing mechanisms for managing data throughput to improve responsiveness during periods of high traffic load.

BACKGROUND

The constituent components of a web-based application (e.g., implemented as microservices using a container-based model, as a non-limiting example) frequently share data provided by a shared storage volume. The data throughput for the shared storage volume may be influenced by a network traffic load on the shared storage volume.

SUMMARY

The examples include managing data throughput for shared storage volumes using variable volatility. A node (e.g., a physical processor-based computing device, as a non-limiting example) managing a shared storage volume on a network according to examples disclosed herein includes a volatility setting. The volatility setting represents a level of data consistency to be enforced by the node managing the shared storage volume. In examples where the volatility setting is a numeric value, the value of the volatility setting is inversely related to a level of enforced data consistency such that a higher volatility setting corresponds to a lower level of data consistency. The node managing the shared storage volume further includes a volatility gateway through which the volatility setting may be modified to increase or decrease data throughput for the shared storage volume. For example, during periods of low traffic load on the shared storage volume, the volatility setting may be set at its lowest level, causing the node managing the shared storage volume to enforce strict data consistency for all data read operations performed on the shared storage volume. Accordingly, any read requests to the shared storage volume during an ongoing write operation are subject to a write lock on the shared storage volume until the write operation is complete. Conversely, during periods of higher traffic load, the volatility setting may be set at a higher level. This causes any read request that is received while a write operation is ongoing to be performed as a dirty read operation (i.e., a read operation that is performed concurrently with another ongoing data access operation, and that may return data of unknown consistency). By providing variable volatility, greater data throughput and responsiveness for the shared storage volume is provided during high load conditions, at a potential cost of reduced data consistency.

In another example, a method for managing data throughput for a shared storage volume using variable volatility is provided. The method comprises receiving, by a node comprising a processor-based device and managing a shared storage volume within a network, a volatility request via a volatility gateway. The method further comprises updating a volatility setting based on the volatility request. The method also comprises receiving, by the node, a read request directed to the shared storage volume. The method additionally comprises determining, by the node, whether strict data consistency for the shared storage volume should be enforced for the read request based on the volatility request. The method further comprises, responsive to determining that strict data consistency should be enforced, acquiring a write lock on the shared storage volume. The method also comprises, responsive to determining that strict data consistency should not be enforced, performing a dirty read operation on the shared storage volume in response to the read request.

In another example, a computing device is provided. The computing device includes a memory and a processor device that is communicatively coupled to the memory and that manages a shared storage volume on a network. The processor device is to receive a volatility request via a volatility gateway. The processor device is to further update a volatility setting based on the volatility request. The processor device is also to receive a read request directed to the shared storage volume. The processor device is additionally to determine whether strict data consistency for the shared storage volume should be enforced for the read request based on the volatility request. The processor device is further to, responsive to determining that strict data consistency should be enforced, acquire a write lock on the shared storage volume. The processor device is also to, responsive to determining that strict data consistency should not be enforced, perform a dirty read operation on the shared storage volume in response to the read request.

In another example, a computer program product for managing data throughput for a shared storage volume using variable volatility is provided. The computer program product is stored on a non-transitory computer-readable storage medium, and includes instructions to cause a processor device to receive a volatility request via a volatility gateway. The instructions also cause the processor device to update a volatility setting based on the volatility request. The instructions also cause the processor device to receive a read request directed to a shared storage volume. The instructions additionally cause the processor device to determine whether strict data consistency for the shared storage volume should be enforced for the read request based on the volatility setting. The instructions further cause the processor device to, responsive to determining that strict data consistency should be enforced, acquire a write lock on the shared storage volume. The instructions also cause the processor device to, responsive to determining that strict data consistency should not be enforced, perform a dirty read operation on the shared storage volume in response to the read request.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Web-based applications are frequently implemented as a plurality of constituent components using container-based platforms such as Docker and/or Kubernetes, as non-limiting examples. To facilitate data sharing between these constituent components, a shared storage volume (representing an in-memory data store or a filesystem data store, as non-limiting examples) may be provided. The data throughput provided by the shared storage volume at a given time will depend in part on the network traffic load being handled by the shared storage volume. In particular, data throughput may be negatively impacted by multiple concurrent data access operations being performed on the shared storage volume, which may result in some data access operations being temporarily blocked in order to maintain data consistency. Decreased data throughput, in turn, results in decreased responsiveness and overall performance of the web application when the shared storage volume is under load. Accordingly, a mechanism to facilitate intelligent management of the read throughput of the shared storage volume under varying load conditions is desirable.

In this regard, a node (e.g., a physical processor-based computing device, as a non-limiting example) managing a shared storage volume on a network according to examples disclosed herein includes a volatility setting that represents a level of data consistency to be enforced by the node managing the shared storage volume. The node managing the shared storage volume further includes a volatility gateway, through which the volatility setting may be modified to increase or decrease data throughput for the shared storage volume. For example, during periods of low traffic load on the shared storage volume, the volatility setting may be set at its lowest level, causing the node managing the shared storage volume to enforce strict data consistency for all data read operations performed on the shared storage volume. During periods of higher traffic load, the volatility setting may be set at a higher level, which causes any read request that is received while a write operation is ongoing to be performed as a dirty read operation. As used herein, a "dirty read operation" refers to a read operation that is performed while another data access operation is concurrently executing. As a result, the consistency state of the data returned by the dirty read operation may be unknown or indeterminate at the time the data is returned. By enabling dirty read operations to be performed, greater data throughput and responsiveness for the shared storage volume are provided during high load conditions.

Figure 1:
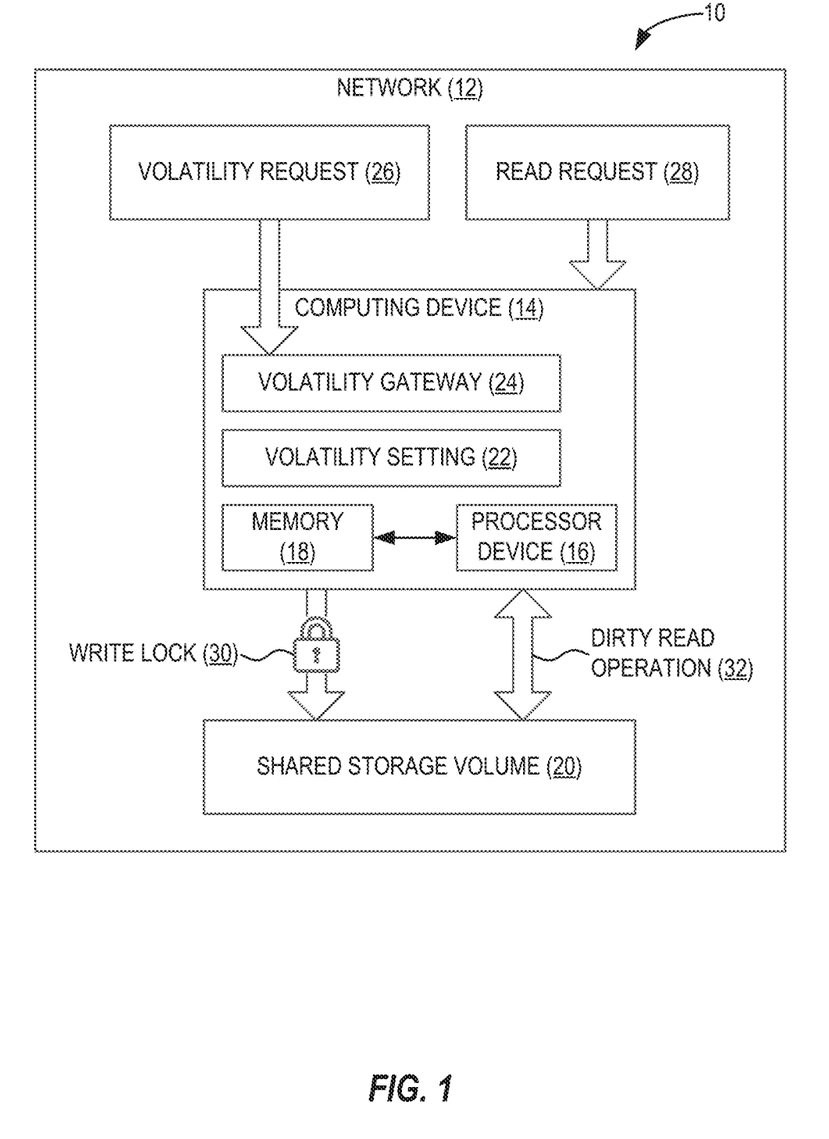
FIG. 1 is a block diagram of a system in which examples may be practiced.

FIG. 1 illustrates a system 10 in which examples may be practiced. The system 10 includes a network 12, which in some examples may comprise a publicly accessible network (e.g., the internet) and/or a private network. The network 12 includes a computing device 14 comprising a processor device 16 that is communicatively coupled to a memory 18. The memory 18 may comprise a random access memory (RAM) such as a dynamic random access memory (DRAM), as a non-limiting example. It is to be understood that, although only a single computing device 14 is illustrated in FIG. 1, the network 12 may include multiple computing devices 14.

The computing device 14 is configured to manage data access operations of a shared storage volume 20. The shared storage volume 20 may comprise an in-memory data store or a filesystem data store, as non-limiting examples, and may be local to the computing device 14 or provided by a remote device (not shown) accessible via the network 12. In some examples, the functionality of the shared storage volume 20 for accessing the underlying data store may be provided by an application container platform such as Kubernetes, as a non-limiting example.

To facilitate management of data throughput for the shared storage volume 20, the computing device 14 includes a volatility setting 22 that indicates a level of data consistency to be enforced by the computing device 14 for data access operations directed to the shared storage volume 20. The volatility setting 22 in some examples may be a Boolean (true/false) value, while some examples may provide that the volatility setting 22 is a numeric value. In the latter example, the numeric value of the volatility setting 22 is inversely related to the level of enforced data consistency, such that a higher value of the volatility setting 22 indicates a lower level of data consistency. As discussed in greater detail below, the volatility setting 22 in some examples may represent a dirty read time interval or a write data threshold, as non-limiting examples.

The computing device 14 further includes a volatility gateway 24 through which other entities (not shown) may submit a volatility request 26 to modify the volatility setting 22. Some examples may provide that the volatility gateway 24 comprises a representational state transfer (REST) endpoint, as a non-limiting example. Upon receiving the volatility request 26, the computing device 14 updates the volatility setting 22 based on the volatility request 26. The computing device 14 then applies the updated volatility setting 22 to future data access operations on the shared storage volume 20.

As seen in FIG. 1, the computing device 14 is configured to receive a read request 28 directed to the shared storage volume 20. The read request 28 represents a requested read operation to be performed on the shared storage volume 20. In response to receiving the read request 28, the computing device 14 determines whether strict data consistency for the shared storage volume 20 should be enforced for the read request 28 based on the volatility setting 22. If so, the computing device 14 acquires a write lock 30 on the shared storage volume 20, which prevents the read request 28 from being performed until any pending write operations have completed. This guarantees data consistency, but may delay completion of the read request 28. However, if the computing device 14 determines, based on the volatility setting 22, that a higher level of data volatility should be used, the computing device 14 performs a dirty read operation 32 to satisfy the read request 28. In this latter case, data responsive to the read request 28 will be retrieved from the shared storage volume 20 and returned to the requesting entity (not shown) more quickly, but is not guaranteed to be the most current data.

In some examples, the volatility setting 22 represents a "dirty read time interval," which specifies a period of time during which the dirty read operation 32 can be performed in response to the read request 28. Some such examples may provide that the computing device 14 determines whether to enforce strict data consistency based on whether a most recent data access for the shared storage volume 20 was performed outside the dirty read time interval specified by the volatility setting 22. Stated differently, if the time interval since the most recent data access for the shared storage volume 20 exceeds the dirty read time interval specified by the volatility setting 22, strict data consistency is applied. Otherwise, if the dirty read time interval has not elapsed since the most recent data access for the shared storage volume 20 was performed, the computing device 14 performs the dirty read operation 32.

Some examples in which the volatility setting 22 represents the dirty read time interval may provide that the computing device 14 determines whether to enforce strict data consistency based on whether a most recent write lock 30 was acquired outside the dirty read time interval specified by the volatility setting 22. Thus, strict data consistency is applied if the time interval since the most recent write lock 30 acquisition for the shared storage volume 20 exceeds the dirty read time interval specified by the volatility setting 22. If the dirty read time interval has not elapsed since the most recent write lock 30 acquisition for the shared storage volume 20, the dirty read operation 32 is carried out responsive to the read request 28.

According to some examples, the volatility setting 22 may represent a "write data threshold" specifying a maximum amount of data written by an ongoing write operation to the shared storage volume 20. The computing device 14 determines whether to enforce strict data consistency based on whether an amount of data written by an ongoing write operation to the shared storage volume 20 exceeds the write data threshold. If so, the computing device 14 acquires the write lock 30 and blocks the read request 28 until the ongoing write operation is complete. If the amount of data written by the ongoing write operation is less than the write data threshold specified by the volatility setting 32, the computing device 14 executes the dirty read operation 32.

Figure 2:
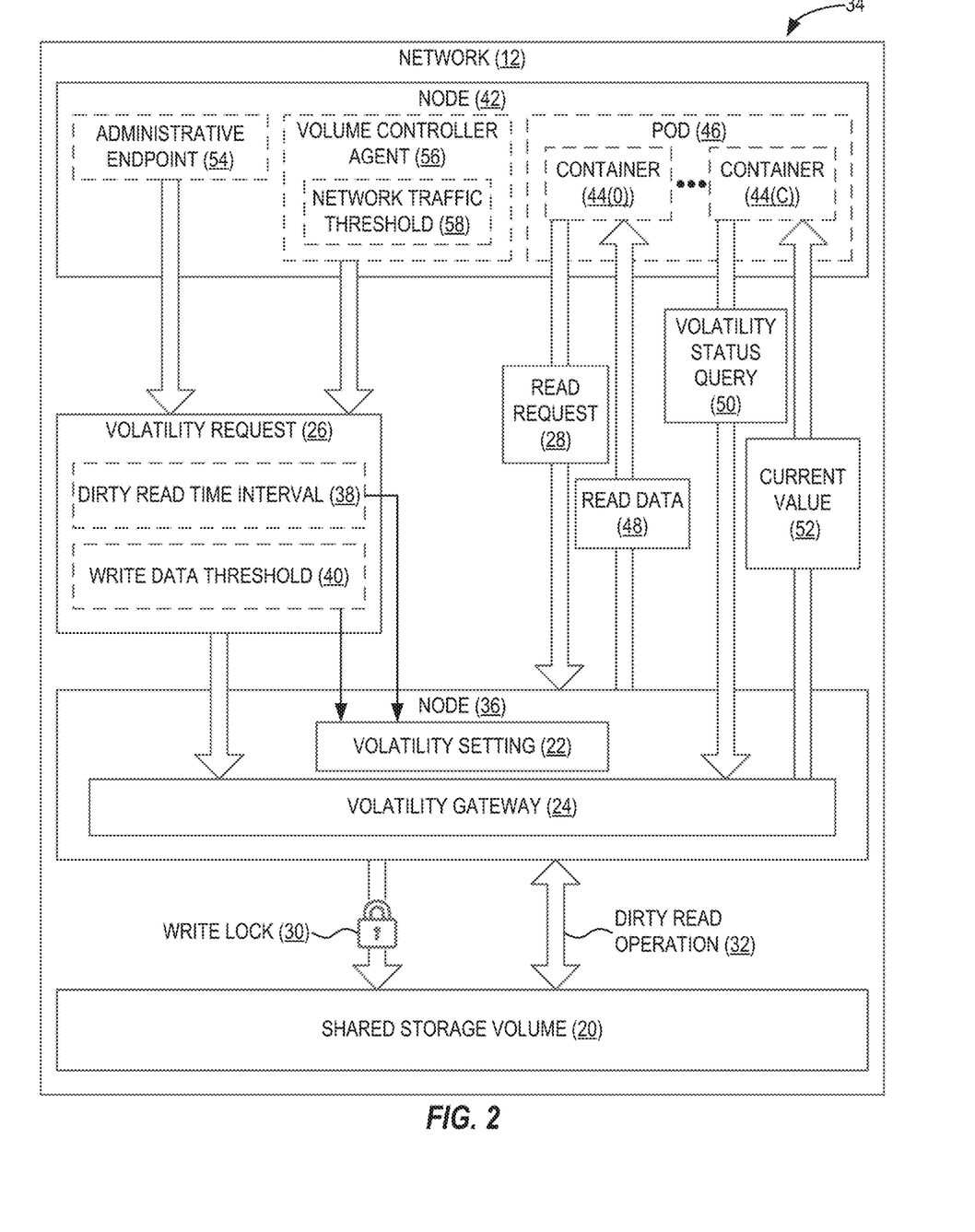
FIG. 2 is a block diagram of a node providing a volatility gateway, and its interactions with a shared storage volume and other entities within a network.

To illustrate additional elements and interactions between the volatility gateway 24 and the shared storage volume 20 of FIG. 1 with other entities within the network 12, FIG. 2 is provided. FIG. 2 shows a system 34 including the network 12 and the shared storage volume 20 of FIG. 1, and a node 36 that corresponds in functionality to the computing device 14 of FIG. 1. Accordingly, the node 36 is configured to receive the volatility request 26 via the volatility gateway 24, update the volatility setting 22, receive the read request 28, and either acquire the write lock 30 or perform the dirty read operation 32 based on the volatility setting 22, as described above with respect to FIG. 1. As seen in FIG. 2, the volatility request 26 according to some examples may specify a dirty read time interval 38 and/or a write data threshold 40 with which the volatility setting 22 may be updated.

In the example of FIG. 2, the network 12 also includes a node 42 comprising a processor device (not shown). The node 42 includes multiple containers 44(0)-44(C) that are organized into a unit referred to as a pod 46. Each of the containers 44(0)-44(C) may comprise, as non-limiting examples, a Docker container or a Kubernetes container, and may encapsulate the resources required to deploy and execute a microservice or other unit of functionality. The containers 44(0)-44(C) in this example are communicatively coupled to the node 36, and share access to the shared storage volume 20. For instance, the node 36 is shown in FIG. 2 as receiving the read request 28 from the container 44(0), and transmitting read data 48 to the container 44(0) in response.

Some examples may provide that the node 36 is further configured to include requesting entities with a current value of the volatility setting 22. As seen in FIG. 2, the node 36 receives a volatility status query 50 from the container 44(C) via the volatility gateway 24. In response, the node 36 transmits a current value 52 of the volatility setting 22 to the container 44(C). The container 44(C) may then use the current value 52 to determine how long before the data provided by the shared storage volume 20 is known to be current, and may submit follow-up read requests 28 if necessary.

In some examples, the node 42 may include an administrative endpoint 54 through which the volatility request 26 may be submitted to the volatility gateway 24 by an operator (not shown) of the node 42. In this manner, an administrator may manually modify the volatility setting 22 of the node 36. Some examples may provide that modification of the volatility setting 22 is performed automatically by a volume controller agent 56 of the node 42. The volume controller agent 56 may be implemented as hardware by the node 42, and/or may be implemented as computer-readable instructions executed by a processor device (not shown) of the node 42. The volume controller agent 56 in this example is configured to monitor network traffic (e.g., over the network 12 as a whole, or a subset such as traffic within a namespace of the containers 44(0)-44(C), as non-limiting examples), and compare a level of network traffic to a network traffic threshold 58. If the network traffic exceeds the network traffic threshold 58, the volume controller agent 56 may automatically transmit the volatility request 26 to the node 36 via the volatility gateway 24 to increase the value of the volatility setting 22.

It is to be understood that the system 34 shown in FIG. 2 may include more or fewer elements than shown. For example, the system 34 may include more or fewer nodes than the node 36 and the node 42 seen in FIG. 2. Likewise, the elements illustrated in FIG. 2 may be arranged or disposed in a different configuration than that shown in FIG. 2 without departing from the scope of this disclosure.

Figure 3:
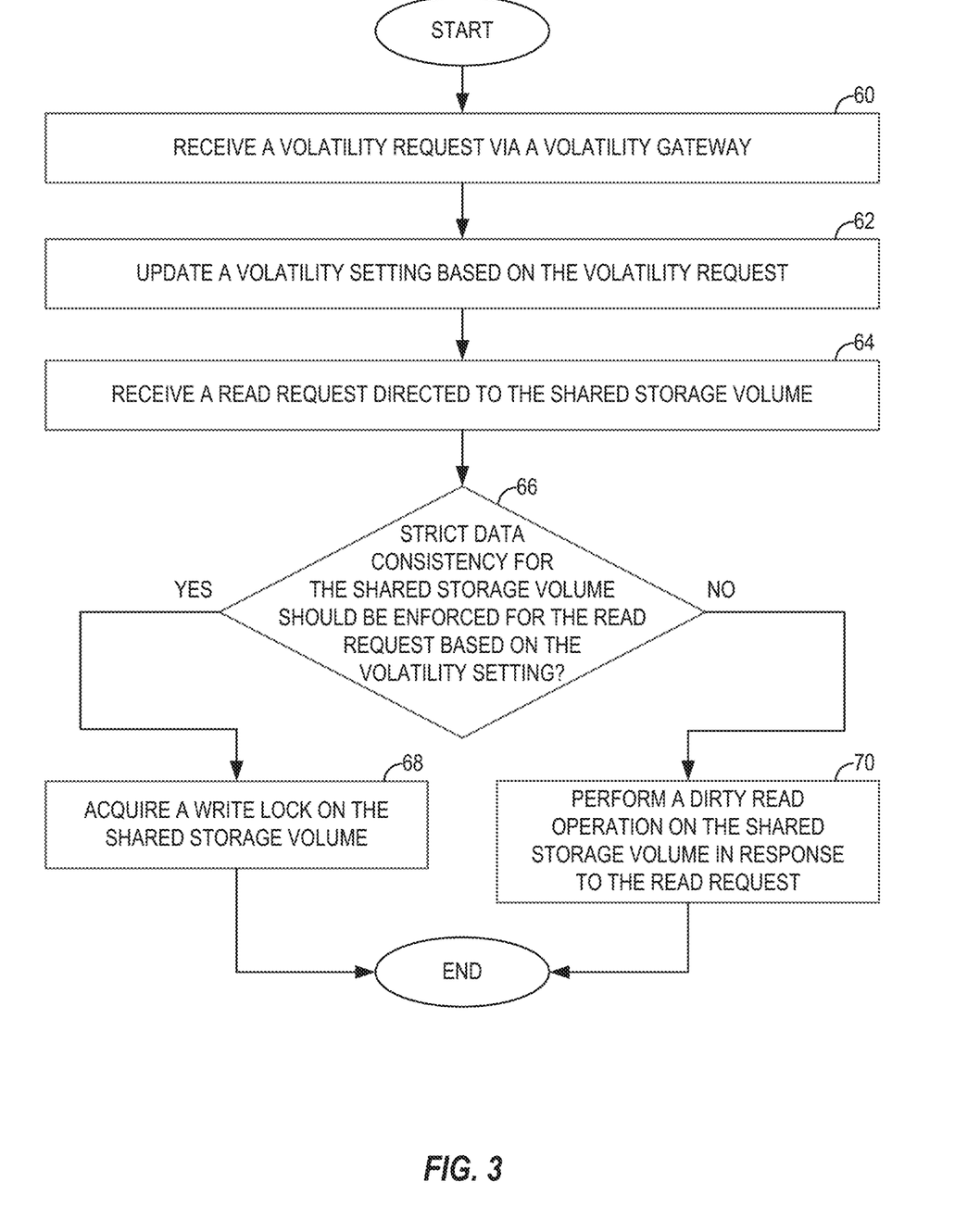
FIG. 3 is a flowchart of a method for managing data throughput for shared storage volumes using variable volatility, according to one example.

FIG. 3 illustrates a method for managing data throughput for shared storage volumes using variable volatility, according to one example. For the sake of clarity, elements of FIG. 1 are referenced in describing FIG. 3. In FIG. 3, operations begin with the computing device 14 receiving the volatility request 26 via the volatility gateway 24 (block 60). The computing device 14 then updates the volatility setting 22 based on the volatility request 26 (block 62).

The computing device 14 next receives the read request 28 directed to the shared storage volume 20 (block 64). The computing device 14 determines whether to enforce strict data consistency for the shared storage volume 20 based on the volatility setting 22 (block 66). If so, the computing device 14 acquires the write lock 30 on the shared storage volume 20 (block 68). However, if the computing device 14 determines at decision block 66 that strict data consistency should not be enforced, the computing device 14 performs the dirty read operation 32 on the shared storage volume 20 in response to the read request 28 (block 70).

Figure 4A:
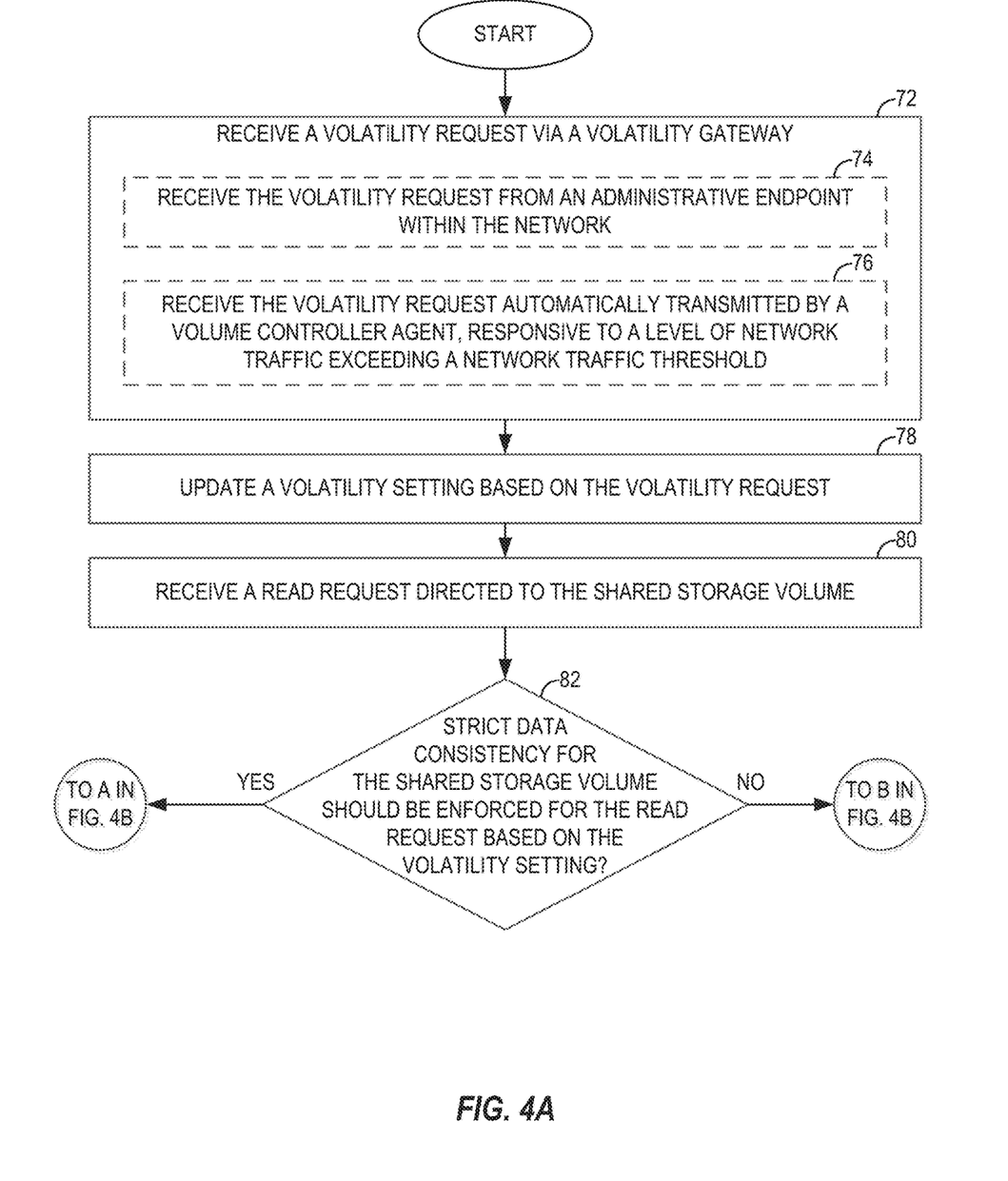
FIGS. 4A and 4B are flowcharts illustrating additional operations according to one example for data throughput for shared storage volumes using variable volatility.
Figure 4B:
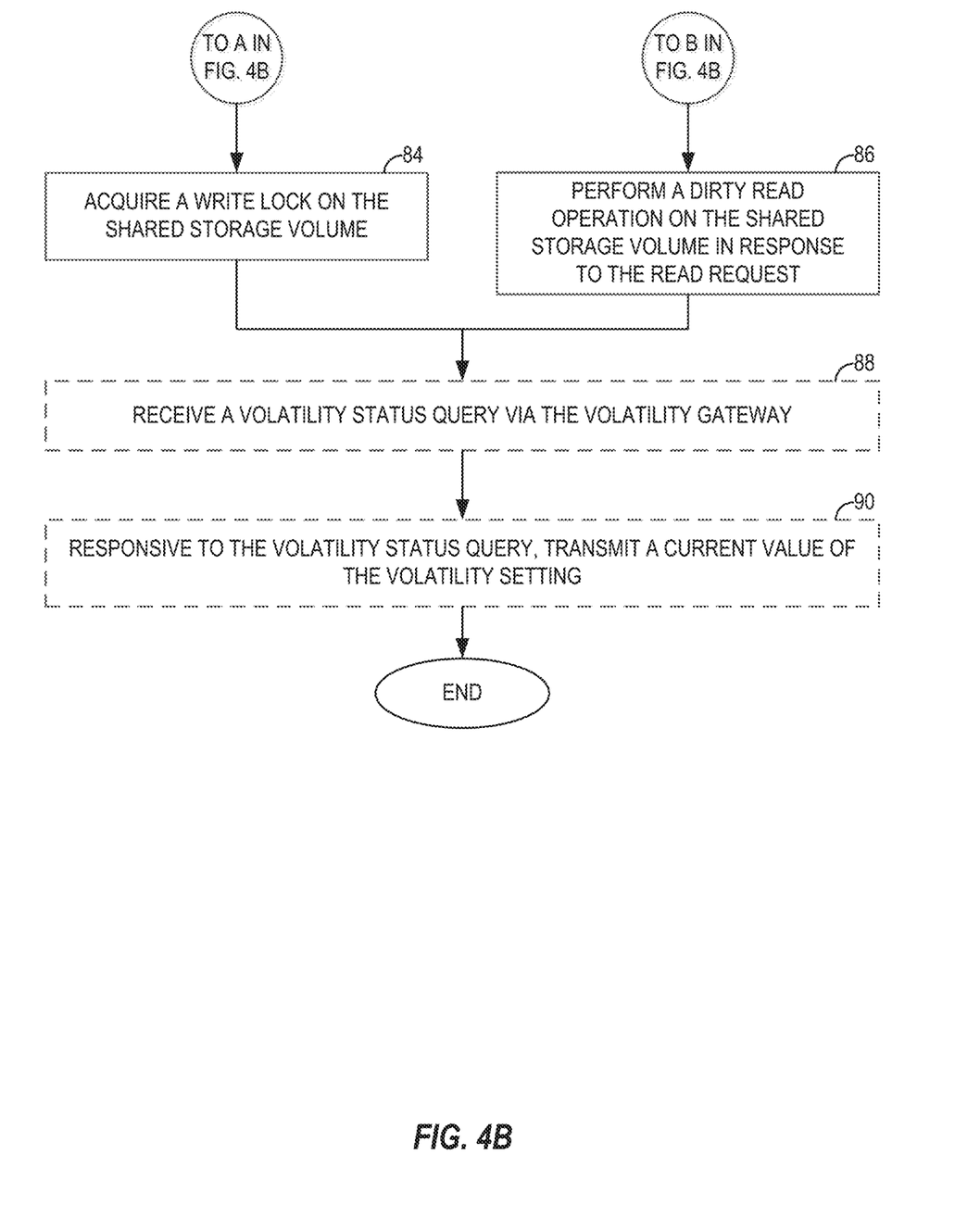

To illustrate additional operations according to one example for managing data throughput for the shared storage volume 20 using the computing device 14 and the volatility gateway 24 of FIG. 1, FIGS. 4A and 4B are provided. Elements of FIGS. 1 and 2 are referenced in describing FIGS. 4A and 4B, for the sake of clarity. Operations in FIG. 4A begin with the computing device 14 receiving the volatility request 26 via the volatility gateway 24 (block 72). In some examples, operations of block 72 for receiving the volatility request 26 may comprise receiving the volatility request 26 from the administrative endpoint 54 within the network 12 (block 74). Some examples may provide that operations of block 72 for receiving the volatility request 26 comprise receiving the volatility request 26 automatically transmitted by the volume controller agent 56, responsive to a level of network traffic exceeding the network traffic threshold 58 (block 76). The computing device 14 then updates the volatility setting 22 based on the volatility request 26 (e.g., by storing a new value for the volatility setting 22 provided by the volatility request 26) (block 78). The computing device 14 next receives the read request 28 directed to the shared storage volume 20 (block 80).

The computing device 14 determines whether to enforce strict data consistency for the shared storage volume 20 based on the volatility setting 22 (block 82). In examples in which the volatility setting 22 represents a dirty read time interval 38, the computing device 14 determines whether a most recent data access for the shared storage volume 20 occurred outside the dirty read time interval 38 or a most recent write lock 30 for the shared storage volume 20 was acquired outside the dirty read time interval 38. In examples in which the volatility setting 22 represents a write data threshold 40, the computing device 14 determines whether an amount of data written by an ongoing write operation to the shared storage volume 20 exceeds the write data threshold 40. If the computing device 14 determines at decision block 82 that strict data consistency should be enforced, processing resumes at block 84 of FIG. 4B. Otherwise, processing resumes at block 86 of FIG. 4B.

Referring now to FIG. 4B, if the computing device 14 determines at decision block 82 that strict data consistency should be enforced, the computing device 14 acquires the write lock 30 on the shared storage volume 20 (block 84). Processing then continues at block 88. However, if the computing device 14 determines at decision block 82 that strict data consistency should not be enforced, the computing device 14 performs the dirty read operation 32 on the shared storage volume 20 in response to the read request 28 (block 86). Processing resumes at block 88.

In some examples, the computing device 14 may receive the volatility status query 50 via the volatility gateway 24 (block 88). In response, the computing device 14 transmits a current value 52 of the volatility setting 22 (block 90).

Figure 5:
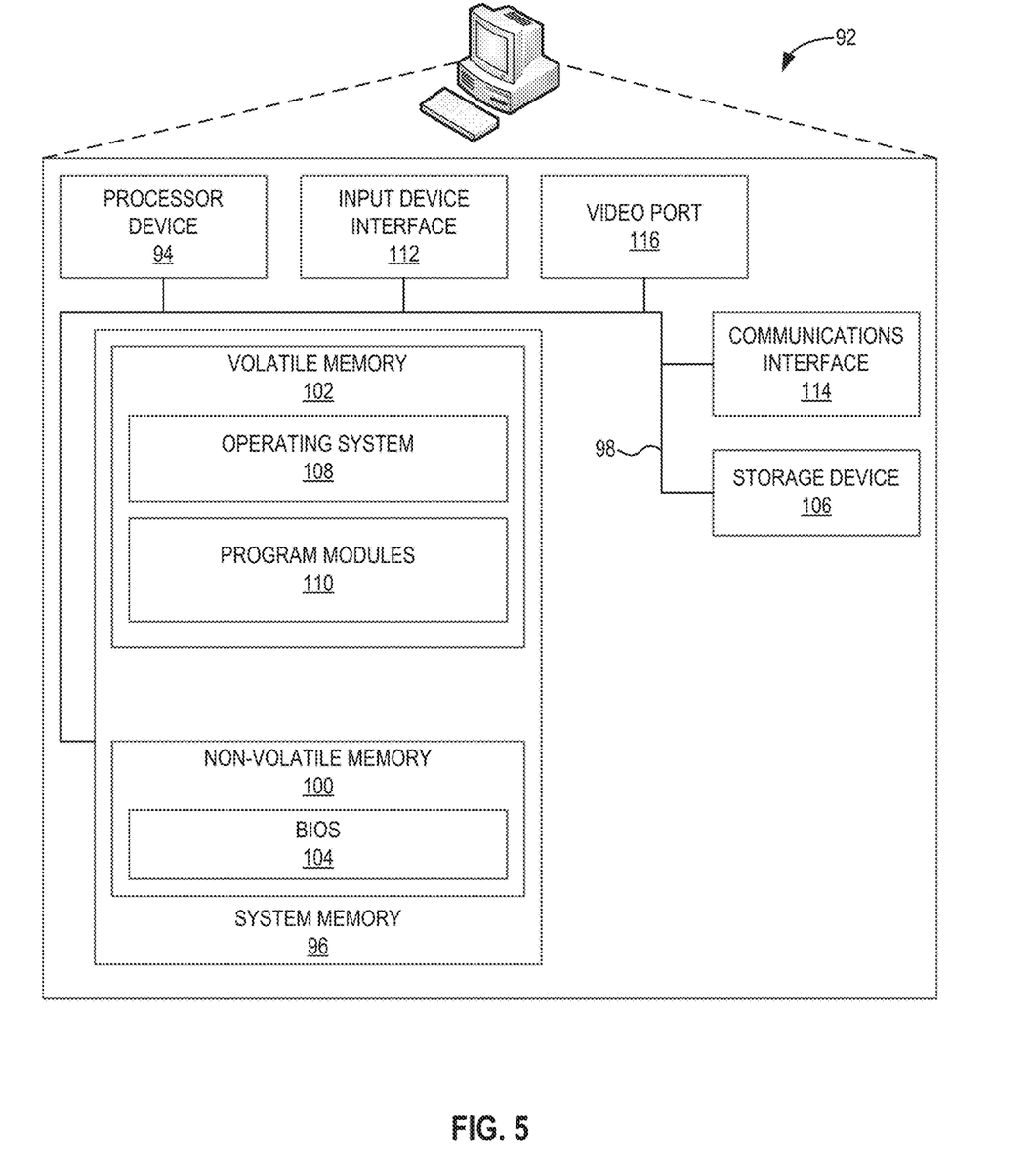
FIG. 5 is a block diagram of a computing device suitable for implementing examples according to one example.

FIG. 5 is a block diagram of a processor-based computing device 92, such as the computing device 14 of FIG. 1 and/or the nodes 36, 42 of FIG. 2, suitable for implementing examples according to one example. The computing device 92 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 92 includes a processor device 94, a system memory 96, and a system bus 98. The system bus 98 provides an interface for system components including, but not limited to, the system memory 96 and the processor device 94. The processor device 94 can be any commercially available or proprietary processor.

The system bus 98 may be any of several types of bus structures that may further interconnect to a memory bus (with or without a memory controller), a peripheral bus, and/or a local bus using any of a variety of commercially available bus architectures. The system memory 96 may include non-volatile memory 100 (e.g., read-only memory (ROM), erasable ROM (EPROM), electrically EPROM (EEPROM), etc.), and volatile memory 102 (e.g., RAM). A basic input/output system (BIOS) 104 may be stored in the non-volatile memory 100 and can include the basic routines that help to transfer information among elements within the computing device 92. The volatile memory 102 may also include a high-speed RAM, such as static RAM, for caching data.

The computing device 92 may further include or be coupled to a non-transitory computer-readable storage medium such as a storage device 106, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 106 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 106 and in the volatile memory 102, including an operating system 108 and one or more program modules 110 which may implement the functionality described herein in whole or in part. It is to be appreciated that the examples can be implemented with various commercially available operating systems 108 or combinations of operating systems 108.

A number of modules can be stored in the storage device 106 and in the volatile memory 102. All or a portion of the examples may be implemented as a computer program product stored on a transitory or non-transitory computer-usable or computer-readable storage medium, such as the storage device 106, which includes complex programming instructions, such as complex computer-readable program code, to cause the processor device 94 to carry out the steps described herein. Thus, the computer-readable program code can comprise software instructions for implementing the functionality of the examples described herein when executed on the processor device 94. The processor device 94 may serve as a controller, or control system, for the computing device 92 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 94 through an input device interface 112 that is coupled to the system bus 98 but can be connected by other interfaces, such as a parallel port, an Institute of Electrical and Electronic Engineers (IEEE) 1394 serial port, a Universal Serial Bus (USB) port, an IR interface, and the like.

The computing device 92 may also include a communications interface 114 suitable for communicating with a network as appropriate or desired. The computing device 92 may also include a video port 116 to interface with a display device to provide information to a user.

What is claimed is:

1. A method comprising:
receiving, by a node comprising a processor-based device and managing a shared storage volume within a network, a volatility request via a volatility gateway;
updating a volatility setting based on the volatility request, wherein the volatility setting is maintained by the node to indicate a level of data consistency to be enforced for all data read operations on the shared storage volume;
receiving, by the node, a read request directed to the shared storage volume;
determining, by the node, that strict data consistency for the shared storage volume should be enforced for the read request based on the volatility setting;
responsive to determining that strict data consistency should be enforced, acquiring a write lock on the shared storage volume;
receiving, by the node, a volatility status query via the volatility gateway; and
responsive to the volatility status query, transmitting, by the node, a current value of the volatility setting;
wherein receiving, by the node, the volatility request comprises receiving the volatility request automatically transmitted by a volume controller agent, responsive to a level of network traffic exceeding a network traffic threshold.

2. The method of claim 1, wherein:
the volatility setting comprises a dirty read time interval; and
determining that strict data consistency for the shared storage volume should be enforced based on the volatility setting comprises determining that a most recent data access for the shared storage volume occurred outside the dirty read time interval.

3. The method of claim 1, wherein:
the volatility setting represents a dirty read time interval; and
determining that strict data consistency for the shared storage volume should be enforced based on the volatility setting comprises determining that a most recent write lock for the shared storage volume was acquired outside the dirty read time interval.

4. The method of claim 1, wherein:
the volatility setting represents a write data threshold; and
determining that strict data consistency for the shared storage volume should be enforced based on the volatility setting comprises determining that an amount of data written by an ongoing write operation to the shared storage volume exceeds the write data threshold.

5. The method of claim 1, wherein receiving, by the node, the volatility request comprises receiving the volatility request from an administrative endpoint within the network.

6. The method of claim 1, wherein the volatility gateway comprises a representational state transfer (REST) endpoint.

7. A computing device, comprising:
a memory; and
a processor device, communicatively coupled to the memory and managing a shared storage volume on a network, to:
receive a volatility request via a volatility gateway;
update a volatility setting based on the volatility request, wherein the volatility setting is maintained by the processor device to indicate a level of data consistency to be enforced for all data read operations on the shared storage volume;
receive a read request directed to the shared storage volume;
determine whether strict data consistency for the shared storage volume should be enforced for the read request based on the volatility setting;
responsive to determining that strict data consistency should be enforced, acquire a write lock on the shared storage volume;
responsive to determining that strict data consistency should not be enforced, perform a dirty read operation on the shared storage volume in response to the read request;
receive a volatility status query via the volatility gateway; and
responsive to the volatility status query, transmit a current value of the volatility setting;
wherein:
the volatility setting represents a write data threshold; and
the processor device is to determine whether strict data consistency for the shared storage volume should be enforced based on the volatility setting by determining whether an amount of data written by an ongoing write operation to the shared storage volume exceeds the write data threshold.

8. The computing device of claim 7, wherein:
the volatility setting represents a dirty read time interval; and
the processor device is to determine whether strict data consistency for the shared storage volume should be enforced based on the volatility setting by determining whether a most recent data access for the shared storage volume occurred outside the dirty read time interval.

9. The computing device of claim 7, wherein:
the volatility setting represents a dirty read time interval; and
the processor device is to determine whether strict data consistency for the shared storage volume should be enforced based on the volatility setting by determining whether a most recent write lock for the shared storage volume was acquired outside the dirty read time interval.

10. The computing device of claim 7, wherein the processor device is to receive the volatility request by receiving the volatility request from an administrative endpoint within the network.

11. The computing device of claim 7, wherein the processor device is to receive the volatility request by receiving the volatility request automatically transmitted by a volume controller agent, responsive to a level of network traffic exceeding a network traffic threshold.

12. The computing device of claim 7, wherein the volatility gateway comprises a representational state transfer (REST) endpoint.

13. A computer program product stored on a non-transitory computer-readable storage medium and including instructions to cause a processor device to:
- receive a volatility request via a volatility gateway;
- update a volatility setting based on the volatility request, wherein the volatility setting is maintained by the processor device to indicate a level of data consistency to be enforced for all data read operations on a shared storage volume;
- receive a read request directed to the shared storage volume;
- determine whether strict data consistency for the shared storage volume should be enforced for the read request based on the volatility setting;
- responsive to determining that strict data consistency should be enforced, acquire a write lock on the shared storage volume; and
- responsive to determining that strict data consistency should not be enforced, perform a dirty read operation on the shared storage volume in response to the read request;

wherein:
- the volatility setting represents a write data threshold;
- the computer program product includes instructions to cause the processor device to determine whether strict data consistency for the shared storage volume should be enforced based on the volatility setting by determining whether an amount of data written by an ongoing write operation to the shared storage volume exceeds the write data threshold; and
- the computer program product includes instructions to cause the processor device to receiving the volatility request by causing the processor to receive the volatility request automatically transmitted by a volume controller agent, responsive to a level of network traffic exceeding a network traffic threshold.

14. The computer program product of claim 13, wherein:
the volatility setting represents a dirty read time interval; and
the computer program product includes instructions to cause the processor device to determine whether strict data consistency for the shared storage volume should be enforced based on the volatility setting by determining whether a most recent data access for the shared storage volume occurred outside the dirty read time interval.

15. The computer program product of claim 13, wherein:
the volatility setting represents a dirty read time interval; and
the computer program product includes instructions to cause the processor device to determine whether strict data consistency for the shared storage volume should be enforced based on the volatility setting by determining whether a most recent write lock for the shared storage volume was acquired outside the dirty read time interval.

* * * * *